(12) United States Patent
Lam et al.

(10) Patent No.: US 9,124,861 B2
(45) Date of Patent: Sep. 1, 2015

(54) DISPLAY CONNECTOR WITH 4K IMAGE RESOLUTION

(71) Applicants: TONGFANG GLOBAL LIMITED, Guangdong Province (CN); SHENYANG TONGFANG MULTIMEDIA TECHNOLOGY CO., LTD., Liaoning Province (CN)

(72) Inventors: Th Lam, Guangdong Province (CN); Wen-Sheng Lu, Guangdong Province (CN); Chih-Ming Huang, Guangdong Province (CN); Tsung-Hsien Chuang, Guangdong Province (CN); Christopher Ng, Guangdong Province (CN)

(73) Assignees: Tongfang Global Limited, Shenzhen, Guangdong Province (CN); Shenyang Tongfang Multimedia Technology Co., Ltd., Shenyang, Liaoning Province (CN)

( * ) Notice: Subject to any disclaimer, the term of this patent is extended or adjusted under 35 U.S.C. 154(b) by 68 days.

(21) Appl. No.: 14/188,863

(22) Filed: Feb. 25, 2014

(65) Prior Publication Data
US 2015/0201154 A1 Jul. 16, 2015

Related U.S. Application Data

(60) Provisional application No. 61/925,726, filed on Jan. 10, 2014.

(51) Int. Cl.
*H04N 5/76* (2006.01)
*H04N 5/93* (2006.01)
*G09G 5/00* (2006.01)
*G06T 3/40* (2006.01)
*H04N 21/4363* (2011.01)

(52) U.S. Cl.
CPC ............. *H04N 5/93* (2013.01); *G06T 3/4007* (2013.01); *G09G 5/006* (2013.01); *H04N 21/43632* (2013.01); *H04N 21/43635* (2013.01)

(58) Field of Classification Search
CPC ............. G06T 3/4007; G09G 5/006; H04N 21/43635; H04N 21/43632
USPC ........................................... 386/294
See application file for complete search history.

(56) References Cited

U.S. PATENT DOCUMENTS

2009/0022176 A1* 1/2009 Nguyen .................. 370/466
2010/0150475 A1* 6/2010 Holland .................. 382/300

* cited by examiner

*Primary Examiner* — Thai Tran
*Assistant Examiner* — Jose Mesa
(74) *Attorney, Agent, or Firm* — Rosenberg, Klein & Lee

(57) ABSTRACT

The invention relates to a display connector with a 4K image resolution. It primarily comprises a first connector, a second connector and a third connector. The present invention is a connector for a display to support high specification images with quad full high definition (QFHD). The third connector is used to connect an existing video playback device merely having the playback function of full high definition (FHD). Then the FHD image data is upscaled through an electrically connected image upscaling module of the first connector, and QFHD image signals with an ultra-high definition resolution is displayed through an electronic display device. Accordingly, the QFHD image signals with the ultra-high definition resolution can be displayed without upgrading the hardware of the player or computer so as to dramatically reduce the required cost of upgrading the hardware.

10 Claims, 5 Drawing Sheets

DISPLAY CONNECTOR WITH 4K IMAGE RESOLUTION

REFERENCE TO RELATED APPLICATION

This Application is based on Provisional Application Ser. No. 61/925,726, filed 10 Jan. 2014.

BACKGROUND OF THE INVENTION

1. Fields of the Invention

The present invention relates to a display connector with a 4K image resolution, especially to a connector for a display to support high specification images with quad full high definition (QFHD). The image of an existing video playback device merely having the playback function of full high definition (FHD) is upscaled to QFHD image signals with an ultra-high definition resolution so as to effectively reduce the required cost of upgrading the hardware of the image player.

2. Descriptions of Related Art

Following by the advance of technology and the quality of life improvement, the demand of the high definition resolution from the user also increases. The image and video resolution currently supported on the market is changed from the common full high definition (FHD) specification to quad full high definition (QFHD) specification, wherein the image and video resolution of the FHD specification is 1920*1080, and the image and video resolution of the QFHD specification is 3840*2160, also referred to as 4K2K.

Although advances in technology drive to quickly upgrade of the analytical capability of the image and video, the image and video processing capabilities of many image playback devices on the market cannot effectively support the highly development of the analytical capability. For example, current CD and DVD players commonly used in many families only support the FHD specification image processing and playback, and they cannot effectively support image data of QFHD specification. Even if the rear end of the display device, such as a television or liquid crystal display, already support to display the image and video with QFHD specification, due to the inherent limitations of the image playback devices, they only output the image with FHD specification.

SUMMARY OF THE INVENTION

Therefore, a display connector with a 4K image resolution is developed herein to dramatically reduce the required cost of upgrading the hardware. A primary goal of the present invention is to provide a display connector with a 4K image resolution, especially to a connector for a display to support high specification images with quad full high definition (QFHD). The image of an existing video playback device merely having the playback function of full high definition (FHD) is upscaled to QFHD image signals with an ultra-high definition resolution so as to effectively reduce the required cost of upgrading the hardware of the image player.

In order to achieve the above object, a display connector with a 4K image resolution includes a first connector, a second connector and a third connector. The first connector connects an image input terminal of an electronic display device and comprises an image upscaling module and an image database having a pixel matrix, wherein the image upscaling module converts a resolution of an original image signal into an output image signal with a 4K image resolution. The second connector electrically connects to the first connector with a first transmission line at an end thereof and to a power supply module at the other end thereof for provision of power as required in driving the first connector. The third connector connects an image output terminal of an image and video playback device, and electrically connects to the first connector with a second transmission line.

In the present invention, the first connector is a high definition multimedia interface (HDMI).

In the present invention, the second connector is a universal serial bus (USB).

In the present invention, the third connector is a high definition multimedia interface (HDMI).

In the present invention, the electronic display device is used for displaying an image and a video, and is a television, a desktop computer, a portable computer, a smart phone, a tablet computer, a digital camera, a personal digital assistant, a display for a vehicle or a portable CD player.

In the present invention, the image and video playback device is a computer, a digital camera, a digital video recorder, a CD player, a DVD player or a blue-ray disc player.

In the present invention, the image upscaling module built in the first connector comprises an image cutting unit and an image merging unit electrically connected to the image cutting unit, wherein the image cutting unit receives an original image signal having a plurality of frames from the image and video playback device, divides each of the frames of the original image signal into a plurality of frames of the original image signal into a plurality of sub-frames to generate a first output image signal containing the sub-frames, and analyzes pixel coordinates of the first output image signal to generate a second output image signal after comparing with a pixel matrix of the image database and upscaling, and the image merging unit receives the second output image signal to recombine and merge a plurality of the sub-frames of the second output image signal into a frame to output a third output image signal to display in the electronic display device for further displaying.

In the present invention, the frame frequency of the first output image signal is higher than that of the second output image signal.

In the present invention, the sub-frames of the first output image signal are image data of full high definition (FHD).

In the present invention, the frames of the third output image signal are image data of quad full high definition (QFHD).

Accordingly, the present invention is under the premise that the hardware of the traditional image and video playback device of the CD or DVD player which merely supports FHD specification cannot be upgraded, the present invention of the display connector with a 4K image resolution is used to separately connect to the electronic display device and the image and video playback device so as to broadcast and display the QFHD image signals with an ultra-high definition resolution through the existing hardware. In addition, the present invention of the display connector with a 4K image resolution transfers the original image singles with resolutions of 480, 570, 720 or 1080 into the output image singles of the 4K resolution through the operation of the image cutting unit and image merging unit in the image upscaling module and the image database, wherein the FHD image single of 1080 resolution is current image specification from the CD or DVD player and computer generally configured in the family. Thus, the QFHD image signals with the ultra-high definition resolution can be displayed without upgrading the hardware of the CD and DVD player or computer so as to dramatically reduce the required cost of upgrading the hardware.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
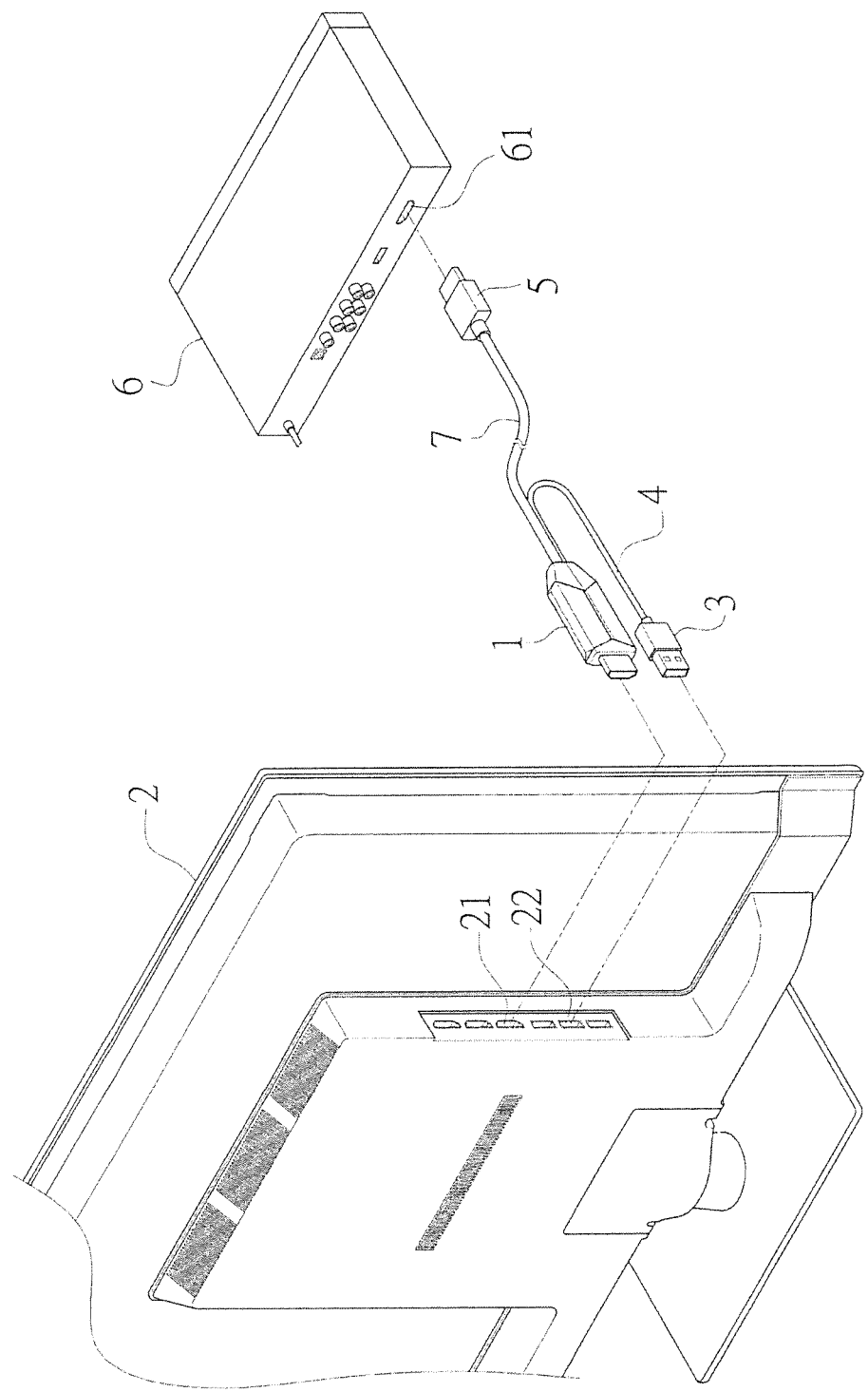
FIG. 1 is a connecting drawing showing an embodiment of a display connector with a 4K image resolution according to the present invention.
Figure 2:
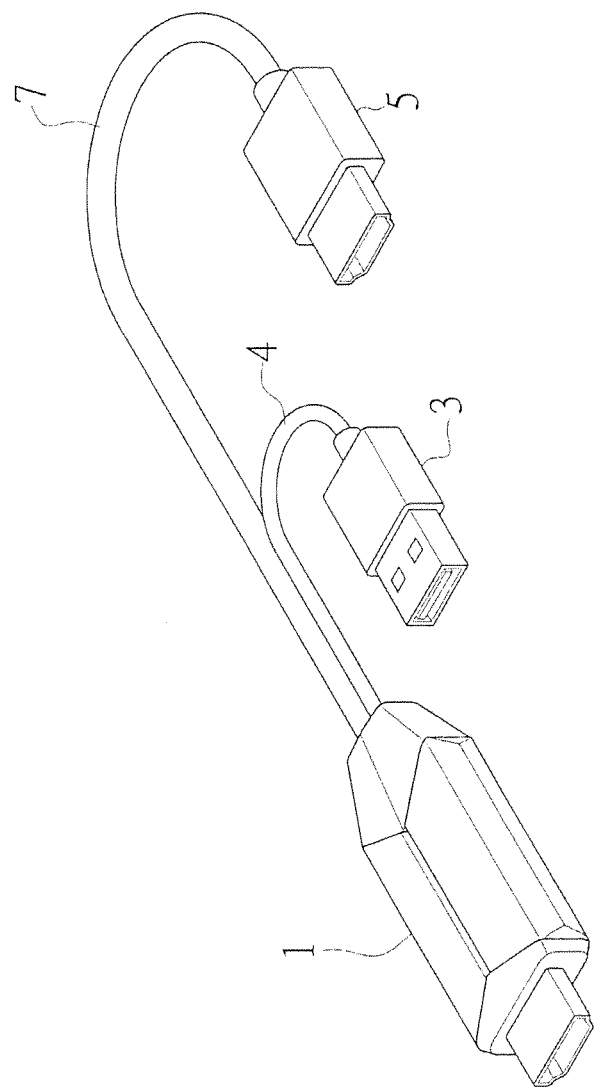
FIG. 2 is a drawing showing an embodiment of a display connector with a 4K image resolution according to the present invention.
Figure 3:
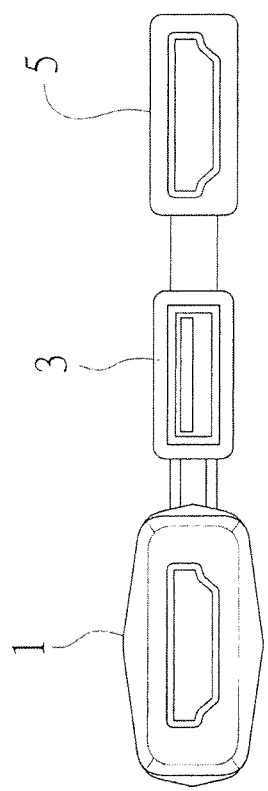
FIG. 3 is a front view showing an embodiment of a display connector with a 4K image resolution according to the present invention.
Figure 4:
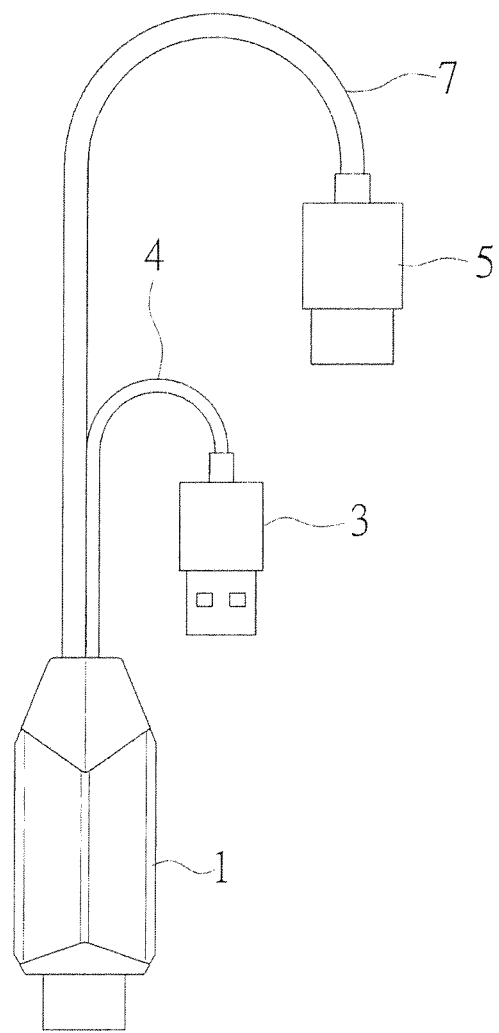
FIG. 4 is a top view showing an embodiment of a display connector with a 4K image resolution according to the present invention.

First, please refer to FIG. 1 to FIG. 4, they are a connecting drawing of an embodiment of a display connector with a 4K image resolution, a drawing, a front view and a top view showing the structure of an embodiment of a display connector with a 4K image resolution according to the present invention, comprising, a first connector (1) connects an image input terminal (21) of an electronic display device (2) and comprises an image upscaling module (11) and an image database (12) having a pixel matrix, wherein the image upscaling module (11) converts a resolution of an original image signal into an output image signal with a 4K image resolution; in the preferred embodiment of the present invention, the first connector (1) is an all-digital video and audio transmission interface of high definition multimedia interface (HDMI).

a second connector (3) electrically connects to the first connector (1) with a first transmission line (4) at an end thereof and to a power supply module (22) at the other end thereof for provision of power as required in driving the first connector (1); in the preferred embodiment of the present invention, the second connector (3) is a universal serial bus (USB) to connect the power supply module (22), USB slot, of the electronic display device (2) to obtain required power for driving the image upscaling module (11) and the image database (12) of the first connector (1); and a third connector (5) connects an image output terminal (61) of an image and video playback device (6), and electrically connects to the first connector (1) with a second transmission line (7); in the preferred embodiment of the present invention, the third connector (5) is a high definition multimedia interface (HDMI) same as the first connector (1).

In addition, the electronic display device (2) is used for displaying an image and a video, and is a television, a desktop computer, a portable computer, a smart phone, a tablet computer, a digital camera, a personal digital assistant, a display for a vehicle or a portable CD player.

Furthermore, the image and video playback device (6) is a computer, a digital camera, a digital video recorder, a CD player, a DVD player or a blue-ray disc player.

Figure 5:
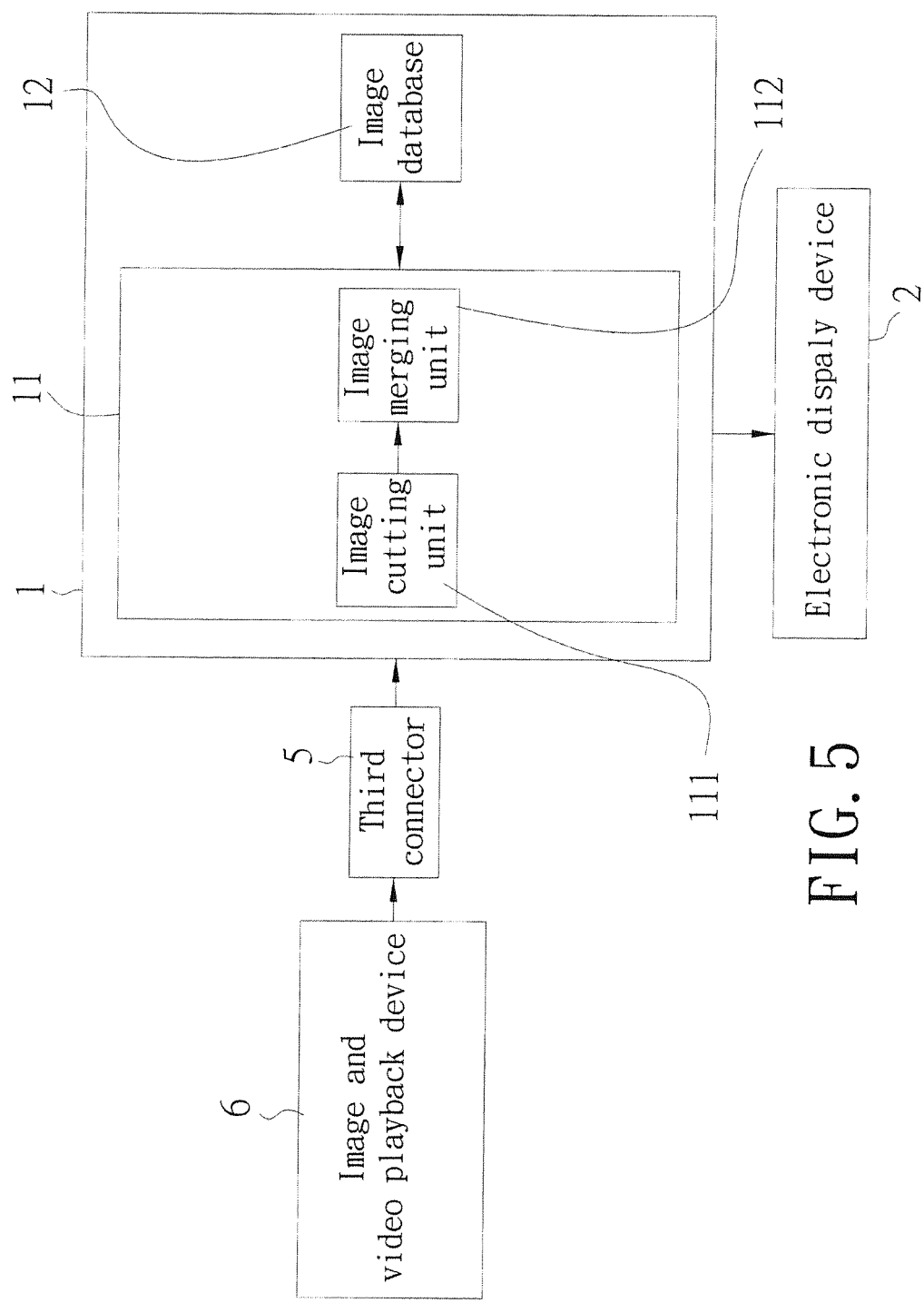
FIG. 5 is a block diagram showing an embodiment of an image upscaling module according to the present invention.

In addition, as referring to FIG. 5, it shows a block diagram showing an embodiment of an image upscaling module according to the present invention, wherein the image upscaling module (11) built in the first connector (1) comprises an image cutting unit (111) and an image merging unit (112) electrically connected to the image cutting unit (111), wherein the image cutting unit (111) receives an original image signal having a plurality of frames from the image and video playback device (6), divides each of the frames of the original image signal into a plurality of the sub-frames to generate a first output image signal containing the sub-frames, and analyzes pixel coordinates of the first output image signal to generates a second output image signal after comparing with a pixel matrix of the image database (12) and upscaling, and the image merging unit (112) receives the second output image signal to recombine and merge a plurality of the sub-frames of the second output image signal into a frame to output a third output image signal to the electronic display device (2) for further displaying.

Furthermore, the frame frequency of the first output image signal is higher than one of the second output image signal. In the preferred embodiment of the present invention, since that every frame of the original image signal is divided into a plurality of sub-frames, the frame frequency of the first output image signal must be raised to maintain considerable transferred speed of frame data.

In addition, the sub-frames of the first output image signal are image data of full high definition (FHD), and the resolution is 1920*1080. The frames of the third output image signal are image data of quad full high definition (QFHD), and the resolution is 3840*2160.

Furthermore, according to the following preferred embodiment of the display connector with a 4K image resolution, the range of practical applications in the present invention can be further demonstrated, but the scope of the present invention is not limited by any ways. When a user has a request of watching image and video, the first connector (1) of the present invention of the display connector with a 4K image resolution is firstly used to connect the image input terminal (21) of the electronic display device (2), wherein the electronic display device (2) is used for displaying an image and a video, and is a television, a desktop computer, a portable computer, a smart phone, a tablet computer, a digital camera, a personal digital assistant, a display for a vehicle or a portable CD player. Then, the USB component of the second connector (3) is used to connect the power supply module (22), USB slot, of the electronic display device (2) to obtain required power for driving the image upscaling module (11) and the image database (12) of the first connector (1), wherein the second connector (3) electrically connects to the first connector (1) with the first transmission line (4). Continually, the third connector (5) is used to connect the image output terminal (61) of the image and video playback device (6), wherein the third connector (5) electrically connects to the first connector (1) with the second transmission line (7), and the image and video playback device (6) is a computer, a digital camera, a digital video recorder, a CD player, a DVD player or a blue-ray disc player. In addition, the powers of the electronic display device (2) and the image and video playback device (6) are started, and the image or video existed in the image and video playback device (6) are outputted from the image output terminal (61) through the device working, and transferred to the first connector (1) through the second transmission line (7) connected to the third connector (5). Continually, the image upscaling module (11) built in the first connector (1) receives the original image single having a plurality of frames from the second transmission line (7). The image cutting unit (111) built in the image upscaling module (11) divides each of the frame of the original image signal into a plurality of sub-frames to generate a first output image signal containing the sub-frames, wherein the sub-frames of the first output image signal are image data of full high definition (FHD), and the resolution is 1920*1080. The image cutting unit (111) analyzes pixel coordinates of the first output image signal to generate a second output image signal after comparing with a pixel matrix of the image database (12) and upscaling. Then, the image merging unit (112) built in the image upscaling module (11) and electrically connected to the image cutting unit (111) receives the second output image signal to recombine and merge a plurality of the sub-frames of the second output image signal into a frame to output a third output image signal to the electronic display device (2) for further displaying, wherein the frames of the third output image signal are image data of quad full high definition (QFHD), and the resolution is 3840*2160. Accordingly, the FHD image data can be upscaled to QFHD image data through the present invention of the display connector with a 4K image resolution to display and playback in the electronic display device (2) which supports the QFHD specification of the image and video.

In summary, a display connector with a 4K image resolution according to the present invention has following advantages compared with techniques available now:

1. The present invention is under the premise that the hardware of the traditional image and video playback device of the CD or DVD player which merely supports FHD specification cannot be upgraded, the present invention of the display connector with a 4K image resolution is used to separately connect the electronic display device and the image and video playback device so as to broadcast and display the QFHD image signals with ultra-high definition resolution through the existing hardware.

2. The present invention of the display connector with a 4K image resolution transfers the original image singles with resolutions of 480, 570, 720 or 1080 into the output image singles of a 4K resolution through the operation of the image cutting unit and the image merging unit in the image upscaling module and the image database, wherein the FHD image single of 1080 resolution is current image specification from the CD or DVD player and computer generally configured in the family. Thus, the QFHD image signals with ultra-high definition resolution can be displayed without upgrading the hardware of the CD and DVD player or computer so as to dramatically reduce the required cost of upgrading the hardware.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display connector with a 4K image resolution, comprising:
   a first connector, connecting an image input terminal of an electronic display device and comprising an image upscaling module and an image database having a pixel matrix, wherein the image upscaling module converts a resolution of an original image signal into an output image signal with a 4K image resolution;
   a second connector, electrically connecting to the first connector with a first transmission line at an end thereof and to a power supply module at the other end thereof for provision of power as required in driving the first connector; and
   a third connector, connecting an image output terminal of an image and video playback device, and electrically connecting to the first connector with a second transmission line.

2. The display connector with a 4K image resolution as claimed in claim 1, wherein the first connector is a high definition multimedia interface (HDMI).

3. The display connector with a 4K image resolution as claimed in claim 1, wherein the second connector is a universal serial bus (USB).

4. The display connector with a 4K image resolution as claimed in claim 1, wherein the third connector is a high definition multimedia interface (HDMI).

5. The display connector with a 4K image resolution as claimed in claim 1, wherein the electronic display device is used for displaying an image and a video, and is a television, a desktop computer, a portable computer, a smart phone, a tablet computer, a digital camera, a personal digital assistant, a display for a vehicle or a portable CD player.

6. The display connector with a 4K image resolution as claimed in claim 1, wherein the image and video playback device is a computer, a digital camera, a digital video recorder, a CD player, a DVD player or a blue-ray disc player.

7. The display connector with a 4K image resolution as claimed in claim 1, wherein the image upscaling module built in the first connector comprises an image cutting unit and an image merging unit electrically connected to the image cutting unit, wherein the image cutting unit receives an original image signal having a plurality of frames from the image and video playback device, divides each of the frames of the original image signal into a plurality of sub-frames to generate a first output image signal containing the sub-frames, and analyzes pixel coordinates of the first output image signal to generate a second output image signal after comparing with a pixel matrix of the image database and upscaling, and the image merging unit receives the second output image signal to recombine and merge a plurality of the sub-frames of the second output image signal into a frame to output a third output image signal to the electronic display device for further displaying.

8. The display connector with a 4K image resolution as claimed in claim 7, wherein the frame frequency of the first output image signal is higher than that of the second output image signal.

9. The display connector with a 4K image resolution as claimed in claim 7, wherein the sub-frames of the first output image signal are image data of full high definition (FHD).

10. The display connector with a 4K image resolution as claimed in claim 7, wherein the frames of the third output image signal are image data of quad full high definition (QFHD).

* * * * *